(12) United States Patent
Hillebrandt et al.

(10) Patent No.: US 10,717,628 B2
(45) Date of Patent: Jul. 21, 2020

(54) APPARATUS FOR UNFOLDING A MAST

(71) Applicant: Deutsches Zentrum für Luft- und Raumfahrt e.V., Köln (DE)

(72) Inventors: Martin Hillebrandt, Braunschweig (DE); Martin Zander, Braunschweig (DE); Christian Huehne, Hannover (DE)

(73) Assignee: DEUTSCHES ZENTRUM FUER LUFT-UND RAUMFAHRT E.V., Cologne (DE)

( * ) Notice: Subject to any disclaimer, the term of this patent is extended or adjusted under 35 U.S.C. 154(b) by 0 days.

(21) Appl. No.: 16/420,256

(22) Filed: May 23, 2019

(65) Prior Publication Data

US 2019/0382231 A1 Dec. 19, 2019

(30) Foreign Application Priority Data

May 28, 2018 (DE) .................. 10 2018 112 690

(51) Int. Cl.
| | | |
|---|---|---|
| *B65H 75/44* | (2006.01) | |
| *B64G 1/22* | (2006.01) | |
| *B64G 1/66* | (2006.01) | |
| *B64G 1/44* | (2006.01) | |

(52) U.S. Cl.
CPC ......... *B65H 75/4471* (2013.01); *B64G 1/222* (2013.01); *B64G 1/44* (2013.01); *B64G 1/66* (2013.01)

(58) Field of Classification Search
CPC . B64G 1/222; B64G 1/44; B64G 1/66; B65H 75/4471
See application file for complete search history.

(56) References Cited

U.S. PATENT DOCUMENTS

| | | | | |
|---|---|---|---|---|
| 1,947,392 A | * | 2/1934 | Guntermann | B65H 75/44 52/108 |
| 2,130,993 A | * | 9/1938 | Dubiller | E04H 12/185 52/108 |
| 2,299,687 A | * | 10/1942 | Farrand | E04H 12/185 52/108 |
| 2,799,368 A | * | 7/1957 | Alter | E04H 12/185 52/108 |
| 3,144,104 A | * | 8/1964 | Weir | F16L 9/17 52/108 |

(Continued)

FOREIGN PATENT DOCUMENTS

EP 1 380 350 A1 1/2004

*Primary Examiner* — James M Ference
(74) *Attorney, Agent, or Firm* — W&C IP

(57) ABSTRACT

An apparatus for unfolding a rolled-up, elongate hollow body provides for stabilizing the unfolding body in a transition region. The hollow body has a closed cross-sectional profile. The unfolding mechanism has a winding core on which the hollow body is rolled up and compressed in a first state, and, by rotation, transfers the hollow body to an unrolled and unfolded second state. The hollow body is guidable between an outer fixing element positioned outside the hollow body and an inner supporting element which lies against an inner wall of the hollow body. The inner supporting element and outer fixing element interact in a form-fitting and/or force-fitting manner for axial positional fixing of the inner supporting element without a directed mechanical connection.

16 Claims, 9 Drawing Sheets

(56) References Cited

U.S. PATENT DOCUMENTS

Figure 1:
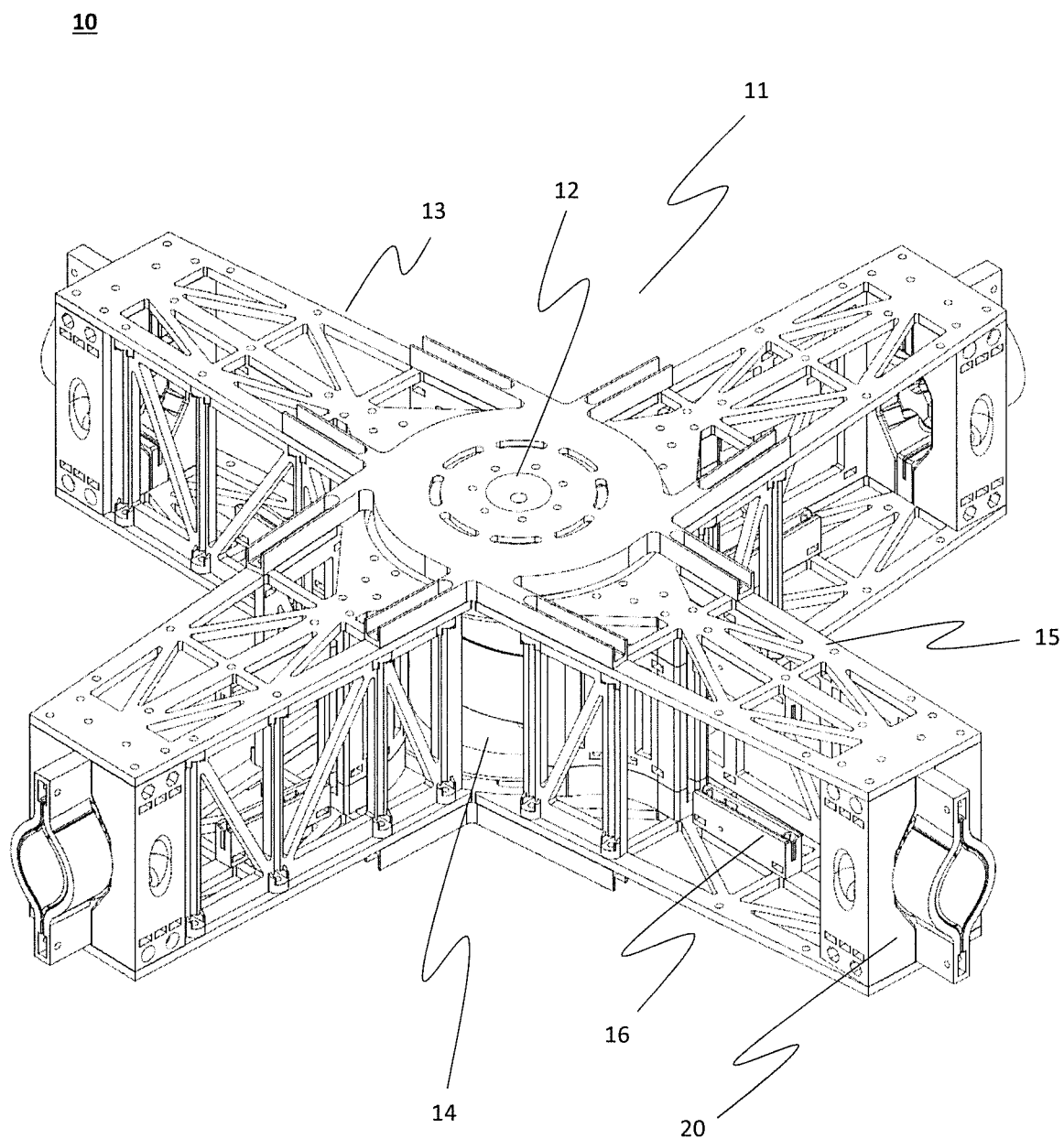

| Patent No. | | Date | Inventor | Classification |
|---|---|---|---|---|
| 3,213,573 | A * | 10/1965 | Bohr | B21C 37/10 52/108 |
| 3,242,576 | A * | 3/1966 | Wheeler | F16M 11/046 33/293 |
| 3,300,910 | A * | 1/1967 | Isaac | E04C 3/005 52/2.19 |
| 3,319,987 | A * | 5/1967 | Bohr | H01Q 1/087 294/210 |
| 3,361,377 | A * | 1/1968 | Trexler, Jr. | H01Q 1/1235 242/390.2 |
| 3,385,397 | A * | 5/1968 | Robinsky | E04H 12/185 182/41 |
| 3,387,414 | A * | 6/1968 | Adams | E04C 3/005 52/108 |
| 3,434,674 | A * | 3/1969 | Groskopfs | H01Q 1/087 242/390.2 |
| 3,499,610 | A * | 3/1970 | Leonard | H01Q 1/087 242/390.2 |
| 3,503,164 | A * | 3/1970 | Medal | E04C 3/005 52/108 |
| 3,508,587 | A * | 4/1970 | Mauch | F16L 11/121 138/119 |
| 3,608,844 | A * | 9/1971 | Tumulty, Jr. | B21C 47/18 242/899 |
| 3,811,633 | A * | 5/1974 | Cummings | B29C 53/20 226/172 |
| 4,386,485 | A * | 6/1983 | Kramer | E04H 12/185 52/108 |
| 4,651,480 | A * | 3/1987 | Kramer | E04H 12/185 182/41 |
| 5,056,278 | A * | 10/1991 | Atsukawa | E04H 12/185 248/161 |
| 6,112,474 | A * | 9/2000 | Paine | E04H 12/185 242/390.2 |
| 6,217,975 | B1 * | 4/2001 | Daton-Lovett | B65G 15/08 428/105 |
| 6,256,938 | B1 * | 7/2001 | Daton-Lovett | F16H 19/064 138/119 |
| 6,508,036 | B1 * | 1/2003 | Cadogan | B64G 1/222 52/108 |
| 7,270,619 | B2 * | 9/2007 | Bourc'His | B66F 3/06 474/153 |
| 7,357,365 | B2 * | 4/2008 | Colman | F16C 11/10 248/439 |
| 7,448,414 | B2 * | 11/2008 | Langeland | E04C 3/005 138/157 |
| 7,806,370 | B2 * | 10/2010 | Beidleman | B64G 1/222 136/245 |
| 7,891,145 | B1 * | 2/2011 | Bobbio | E04H 12/185 242/379.2 |
| 8,683,755 | B1 * | 4/2014 | Spence | B64G 1/222 136/245 |
| 8,893,442 | B1 * | 11/2014 | Spence | E04C 3/005 52/108 |
| 8,950,125 | B2 * | 2/2015 | Kensinger | E04H 12/185 52/108 |
| 9,156,568 | B1 * | 10/2015 | Spence | B64G 1/222 |
| 9,528,264 | B2 * | 12/2016 | Freebury | E04C 3/005 |
| 9,580,190 | B1 * | 2/2017 | Spence | B64G 1/222 |
| 2005/0183279 | A1 * | 8/2005 | Wheaton | G01B 3/1082 33/755 |
| 2010/0242659 | A1 * | 9/2010 | Saito | B25J 9/104 74/490.04 |
| 2010/0319270 | A1 * | 12/2010 | Slade | B64G 1/222 52/71 |
| 2011/0204186 | A1 * | 8/2011 | Keller | B64G 1/222 244/172.6 |
| 2011/0210209 | A1 * | 9/2011 | Taylor | B64G 1/222 244/172.6 |
| 2011/0308174 | A1 * | 12/2011 | Meyer | E04C 3/005 52/111 |
| 2012/0012154 | A1 * | 1/2012 | Keller | B64G 1/222 136/245 |
| 2012/0090660 | A1 * | 4/2012 | Keller | B64G 1/222 136/245 |
| 2013/0061541 | A1 * | 3/2013 | Taylor | B29C 67/0014 52/108 |
| 2013/0186011 | A1 * | 7/2013 | Keller | E04H 12/00 52/108 |
| 2014/0123575 | A1 * | 5/2014 | Bobbio | E04H 12/185 52/108 |
| 2014/0151485 | A1 * | 6/2014 | Baudasse | B64G 1/222 242/375 |
| 2014/0230949 | A1 * | 8/2014 | Daton-Lovett | B64G 1/222 138/177 |
| 2015/0144740 | A1 * | 5/2015 | Turse | B64G 1/44 244/172.6 |
| 2015/0259911 | A1 * | 9/2015 | Freebury | E04C 3/005 52/108 |
| 2015/0284955 | A1 * | 10/2015 | Adams | E04C 3/005 52/108 |
| 2015/0368903 | A1 * | 12/2015 | Turse | B65H 75/4402 242/407 |
| 2016/0032609 | A1 * | 2/2016 | Kucinski | B21C 37/0818 52/108 |
| 2016/0137319 | A1 * | 5/2016 | Steele | B64G 1/443 52/745.2 |
| 2016/0177567 | A1 * | 6/2016 | Gandhi | B64G 9/00 52/108 |
| 2016/0311558 | A1 * | 10/2016 | Turse | B64G 1/222 |
| 2016/0332752 | A1 * | 11/2016 | Abrams | B64G 1/222 |
| 2017/0058524 | A1 * | 3/2017 | Fernandez | E04C 3/005 |
| 2017/0158357 | A1 * | 6/2017 | Hart, III | B64G 1/66 |
| 2017/0297749 | A1 * | 10/2017 | Steele | B65H 75/28 |
| 2017/0298628 | A1 * | 10/2017 | Rakow | E04C 3/005 |
| 2018/0111703 | A1 * | 4/2018 | Hensley | B64G 1/222 |

* cited by examiner

APPARATUS FOR UNFOLDING A MAST

The invention relates to an apparatus for unfolding a rolled-up, elongate hollow body, in particular an unfoldable mast.

Since the beginning of space travel, masts as carriers for sensors and instruments have been used as a supporting structure for solar arrays, antennae and solar sails and for other applications. Since, however, even nowadays the transport of goods, such as, for example, satellites, are subject to a strict weight and space restriction, masts protruding from the transported load are a not insignificant problem. Use is therefore very frequently made of unfoldable masts which are initially prepared in a rolled-up and compressed state for transport into space and are then unrolled and unfolded at the destination, thus enabling them to be correspondingly stable and to be able to correspondingly support the corresponding instruments, sensors or solar sails.

Such an unfoldable mast generally consists of an elongate hollow body, the cross section of which is configured in such a manner that the elongate hollow body can be reshaped to form a flat band. Depending on the design, said flat band is biased to unfold and therefore to form the corresponding cavity within the elongate hollow body.

Accordingly, within the context of the present invention, an elongate hollow body is understood as meaning a component which can be present both in the unfolded and in the rolled-up state and does not have any cavity in the rolled-up state. Within the broadest context, the term elongate hollow body here defines the capability of forming such a cavity within the elongate hollow body, namely whenever the elongate hollow body is unrolled and unfolded.

Such an elongate hollow body which is intended to be used as an unfoldable mast, in particular in space travel, is rolled up here on a winding core, as a result of which it is inevitably present in a manner correspondingly rolled up as a flat band on the winding core. If the winding core is now rotated about its axis, the rolled-up, elongate hollow body is transferred from its rolled-up first state into an unrolled and unfolded second state, wherein, during the unrolling from the winding core, the elongate hollow body assumes its original cross-sectional shape again or a transition cross-sectional shape and is unfolded and therefore forms the cavity within the elongate hollow body.

Unfoldable masts of this type are generally produced from thin-walled shells made of metal or fiber composite materials, wherein the individual shells because of their small wall thickness can be elastically deformed to form a flat band and can thereby be rolled up in a space-saving manner on the winding core. A differentiation is made here basically between two types of unfoldable masts, which are also called shell masts, namely those with an open cross-sectional profile and those with a closed cross-sectional profile. In the case of an open cross-sectional profile, the unfoldable mast has a discontinuous cross-sectional profile, for example in the form of an elongate opening or slot in the cross-sectional profile, as a result of which the mast can be better rolled up and unfolded. Unfoldable masts of this type having an open cross-sectional profile can be unfolded to form a single-layered band, as a result of which they can be rolled up in a substantially more space-saving manner onto the winding core.

In contrast thereto, unfoldable masts with a closed cross section do not have any such axial slit, as a result of which basically a more stable structure is unfolded, but the latter can no longer be rolled up onto the winding core in a single layer. The radial space around the winding core therefore restricts the length of the rolled-up shell mast significantly more in the case of a closed cross section than in the case of an unfoldable mast with an open cross-sectional profile.

A structurally critical feature of such elongate hollow bodies which are intended to be used as unfoldable shell masts is the transition region between the part of the hollow body which is still rolled-up and is pressed flat and the already completely unfolded section. In said transition region, the cross section of the elongate hollow body is not yet completely developed, and therefore both the rigidity and the stability are substantially reduced. In practice, the transition region is therefore stabilized from the outside with further supporting elements, such as external molded shells or external guide rolls in order thus to be able to correspondingly dissipate the generally higher loads during the unfolding in the transition region.

Shell masts with an open cross-sectional profile make it possible to be supported from the outside by molded shells and from the inside by a core which is connected to the outer molded shells since the core can be fastened towards the outside through the lateral opening of the mast. As a result, the profile of the mast is very readily protected against deformation under load, such as against the formation of bulges, and is restricted in the transition region. This results in a desirable rigidity and stability. However, a disadvantage of masts with an open profile is the low torsional rigidity, in particular during the unfolding operation. This type is thus sensitive to torsional flexural buckling, in particular in the case of slender, long masts.

Unfoldable masts with a closed cross-sectional profile do not have this disadvantage, and therefore they are structurally significantly more efficient at high degrees of slenderness and great lengths. However, it is of disadvantage that the supporting of the transition region is substantially more difficult since support by means of molded shells can only take place here from the outside because of the closed cross-sectional profile. This leads to deformations arising due to loading being able to form inward without hindrance, as a result of which the rigidity and the stability of the mast has hitherto been greatly reduced in the transition region.

Against this background, it is an object of the present invention to specify an improved apparatus for unfolding a rolled-up, elongate hollow body, in particular an unfoldable shell mast, with which elongate hollow bodies with a closed cross-sectional profile can be correspondingly supported, in particular in the transition region, and thus to prevent a reduction in the stability, in particular in the transition region, during the unfolding of the mast.

The object is achieved according to the invention with the apparatus according to claim 1. Advantageous embodiments of the invention are found in the corresponding dependent claims.

According to claim 1, an apparatus for unfolding a rolled-up, elongate hollow body is proposed, wherein, according to the generic type, the apparatus has at least one elongate hollow body which has a closed cross-sectional profile. Furthermore, the apparatus has an unfolding mechanism which has at least one winding core on which the elongate hollow body is rolled up and compressed in a first state and which, by rotation, transfers the elongate hollow body from the first state into an unrolled and unfolded second state.

Within the context of the present invention, an elongate hollow body is accordingly understood as meaning a component which can both be compressed to form a flat band and can also have a stabilizing cross section with a cavity.

Accordingly, the elongate hollow body can be rolled up onto a winding core, as a result of which the elongate hollow body is compressed to form a flat band. If the elongate hollow body is then unrolled in said flat, compressed state, it unfolds and accordingly forms a cavity within the elongate hollow body. Accordingly, the body which is wound up onto the winding core and is compressed is also understood as meaning a hollow body within the context of the present invention since it has the corresponding cavity at least in the second state.

According to the invention, the unfolding mechanism has a supporting device, wherein the supporting device has an inner supporting element which is arranged in a cavity within the elongate hollow body and at least partially lies against the inner wall of the elongate hollow body, and has an outer fixing element which is arranged outside the elongate hollow body in the region of the inner supporting element such that the elongate hollow body can be guided through between the outer fixing element and the inner supporting element, wherein the inner supporting element and the outer fixing element are designed in such a manner that the inner supporting element interacts with the outer fixing element in the axial direction in a form-fitting and/or force-fitting manner for axial positional fixings of the inner supporting element without being directly mechanically connected thereto.

Accordingly, the supporting element and the fixing element are designed in such a manner that together they form a form-fitting and/or force-fitting connection, and therefore the inner supporting element is fixed axially at its position in the cavity of the elongate hollow body by the outer fixing element by means of a form-fitting and/or force-fitting connection. By means of the form-fitting and/or force-fitting connection, it is possible that, during the transfer of the elongate hollow body from the first state into the second state, said hollow body can be guided through between the supporting element and the fixing element and thus carries out a relative movement between the supporting element and the fixing element, wherein supporting element and fixing element are specifically not directly connected mechanically to each other since the elongate hollow body has a closed cross-sectional profile and therefore a direct connection of the inner supporting core or supporting element to the outer fixing element is specifically impossible. On the contrary, the inner supporting element is held on the fixing element by a form-fitting connection and/or a force-fitting connection, and therefore the supporting element can be fixed at its axial position within the elongate hollow body without a direct mechanical connection between the supporting element and the fixing element.

It is thereby possible, during the unfolding of the elongate hollow body, which can be, for example, an unfoldable mast for space travel applications, in particular to correspondingly stabilize the transition region in order thereby to improve the stability of the mast and in particular to oppose deformations inward. This is because specifically in the transition region, into which the mast has not yet completely unfolded its full cross-sectional shape, the stabilization from the inside out is particularly advantageous, and therefore, during the whole unfolding process, the elongate hollow body can be supported from the inside and thus provides a significant increase in the rigidity, stability and overall load-bearing capability and therefore also a great extension of the use options.

The outer fixing element is advantageously designed here in such a manner that it surrounds the entire elongate hollow body in the region to be fixed and, together with the supporting element or supporting core arranged on the inside of this region, forms a form-fitting connection and/or a force-fitting connection, as a result of which, when the mast is guided through between the fixing element and the supporting element in the unfolding direction, the inner supporting element remains at the predetermined axial position of the unfolded elongate hollow body.

In an advantageous manner, the unfolding mechanism has a framework or carrying structure on which the winding core and the outer fixing element are fixedly arranged, and therefore the outer fixing element specifically cannot carry out any relative movement with respect to the winding core. By this means, the inner supporting element is also fixed in respect of a relative movement with respect to the winding core and therefore remains at the predetermined axial position. This does not mean that the outer fixing element of the supporting device is not arranged in an optionally rotatable manner on the framework in order thus optionally to compensate for tangential movements during the unfolding of the elongate hollow body.

As already mentioned, it is advantageous if the supporting device of the unfolding mechanism is arranged in a transition region within the unfolding path, within which one section of the elongate hollow body is unrolled from the winding core, but is not yet completely unfolded. Starting from the entire unfolding path from the completely rolled-up, elongate hollow body as far as the completely unrolled hollow body, the transition region is located close to the winding core in a section in which, although the elongate hollow body already forms a cavity, it has not yet, however, achieved its complete cross-sectional profile. This transition region is ultimately owed to the fact that the elongate hollow body cannot abruptly take up its shape from the rolled-up, compressed state to the unfolded and unrolled state, but rather that such a change in shape of the elongate hollow body from the compressed state into the unfolded state takes place uniformly and steadily. However, in said transition region, the elongate hollow body has its greatest weak point in respect of the stability and rigidity during the unfolding, and therefore supporting of the elongate hollow body with the inner supporting element is particularly advantageous in said transition region.

In a further advantageous embodiment, the supporting device has a form-fitting mechanism with which a form-fitting connection can be formed between a form-fitting element of the inner supporting element and a form-fitting element of the outer fixing element in order thus to fix the inner supporting element through the wall of the elongate hollow body. For this purpose, the form-fitting mechanism has at least two, for example roll-shaped, dome-shaped and/or spherical, form-fitting elements, wherein the first form-fitting element is arranged on the inner supporting element and the second form-fitting element is arranged on the outer fixing element such that the elongate hollow body can be guided through between the first and the second form-fitting element during the unfolding. The two form-fitting elements are arranged here on the supporting device in such a manner that the first form-fitting element forms a form-fitting connection with the second form-fitting element in the axial direction of the elongate hollow body and thus fixes the inner supporting element in the axial direction. The elongate hollow body which is guided through between the two form-fitting elements is easily pushed in or buckled in this region since, owing to the arrangement of the two form-fitting elements, there is no continuous, rectilinear profile in the axial direction or in the unfolding direction (parallel to the axial direction or parallel to the unfolding direction). By means of this form-fitting connection produced owing to the two rolls and their corresponding arrangement with respect to each other, the inner supporting element of the supporting device can be positioned and fixed in the axial direction at the position of the fixing element without a direct mechanical connection to the inner supporting element being required.

With at least two form-fitting elements, as discussed above, it is possible to fix the inner supporting element in at least one axial direction, preferably in the unfolding direction, wherein fixing solely because of the tapering cross section is caused solely by the shape counter to the unfolding direction.

With the form-fitting elements, a constriction or buckling is therefore produced in the cross section of the elongate hollow body, said cross section then serving for fixing the respectively opposite form-fitting element.

The form-fitting elements can be, for example, rolls or rollers, wherein the roll- or roller-shaped form-fitting elements have a smaller distance between the center points perpendicularly to the unfolding direction than the sum of the radii of the two roll-shaped form-fitting elements has a whole. In other words, the center points of the two form-fitting elements do not lie on a common plane running perpendicularly to the unfolding direction or axial direction of the elongate hollow body, and therefore said center points are arranged offset with respect to one another and can thus form a form-fitting connection in the unfolding direction.

However, the form-fitting elements can also be slidable elements which have an at least partially curved sliding surface or contact surface with which the form-fitting elements are in contact with the respective elongate hollow body. The form-fitting elements here have a sliding section with which the form-fitting elements can make contact with the respective elongate hollow body and can thus form the corresponding form-fitting connection. Fixed form-fitting elements of this type can be, for example, dome-shaped, spherical-head-shaped and/or partially curved. Spherical-head-shaped is understood as meaning that the sliding surface or contact surface at least partially corresponds to a spherical shape.

In a further advantageous embodiment, it is provided that a third form-fitting element is used which is either arranged on the supporting element and interacts with the second form-fitting element in a form-fitting manner in the manner of the first form-fitting element, or which is arranged on the fixing element and interacts with the first form-fitting element in a form-fitting manner in the manner of the second form-fitting element. With at least three such form-fitting elements, it is possible to fix the inner supporting element axially both in the unfolding direction and axially counter to the unfolding direction, and therefore the supporting core is always fixed at the axial position predetermined by the fixing element and remains there.

Accordingly, it is provided in this embodiment that the second form-fitting element is arranged on the fixing element whereas the first and third form-fitting element is arranged on the supporting element upstream and downstream of said second form-fitting element. Said three form-fitting elements do not lie here in a common plane which lies perpendicularly to the unfolding direction or perpendicularly to the axial orientation of the elongate hollow body in the unfolded second state. In the case of roll-shaped form-fitting elements, the distance between the center points perpendicularly to the unfolding direction or axially in the direction of the elongate hollow body between the second and the first and the second and the third roll-shaped form-fitting element is smaller than the sum of the radii of the second and first roll-shaped form-fitting element or of the second and the third roll-shaped form-fitting element is.

Accordingly, there is no rectilinear, axial line between the three form-fitting elements, and therefore the inner supporting element cannot be moved in the axial direction if the outer fixing element is fixed.

Accordingly, it is likewise conceivable for the first form-fitting element to be arranged on the inner supporting element whereas the second and third form-fitting element is arranged on the outer fixing element, wherein the first roll-shaped form-fitting element lies in the axial direction between the second and the third form-fitting element of the fixing element. In the previously mentioned embodiment, in which the fixing element has only the second form-fitting element, the second form-fitting element lies between the first and the third roll-shaped form-fitting element in an axial orientation of the elongate hollow body.

In a further advantageous embodiment, the supporting device has a plurality of such form-fitting mechanisms which each has at least two, advantageously three, form-fitting elements. This has the advantage that tilting of the inner supporting element is prevented in the case of relatively large cross-sectional shapes and therefore a uniform sliding through of the elongate hollow body during the unfolding process can be ensured.

It is conceivable in this connection that at least two of the form-fitting mechanisms are arranged in such a manner that the plane of the contact surfaces of the form-fitting elements of the first form-fitting mechanism run at an angle of less than 180° with respect to the plane of the contact surfaces of the form-fitting elements of the second form-fitting mechanism, preferably at an angle of between 90° and 180°.

In the case of roll-shaped form-fitting elements, the axes of the roll-shaped form-fitting elements of the first form-fitting mechanism run at an angle of less than 180° with respect to the axes of the roll-shaped form-fitting elements of the second form-fitting mechanism.

It is conceivable in this connection that a third and a fourth form-fitting mechanism is provided whose plane of the contact surfaces of the form-fitting elements likewise run at an angle of less than 180°, but preferably of greater than 90°, and therefore at least four form-fitting mechanisms are provided which, in particular with the inner supporting element, avoid tilting of the inner supporting element within the elongate hollow body.

However, it is alternatively also conceivable that the first form-fitting mechanism is provided on the supporting device on a first side with respect to the elongate hollow body and the at least second form-fitting mechanism is provided on the supporting device on a second side, which lies opposite the first side, with respect to the elongate hollow body. It is conceivable here for the plane of the contact surfaces of the form-fitting elements of the first form-fitting mechanism to run substantially parallel to the plane of the contact surfaces of the form-fitting elements of the second form-fitting mechanism. By this means, the supporting element is supported both on the upper and on the lower side of the elongate hollow body. In the case of a shell-shaped, elongate hollow body which is produced from two half shells, it is conceivable here for the first form-fitting mechanism to be in engagement on a first half shell while the second form-fitting mechanism is in engagement on a second half shell.

In the case of roll-shaped form-fitting elements, the axes of the roll-shaped form-fitting elements of the first form-fitting mechanism can run parallel to the axes of the roll-shaped form-fitting elements of the second form-fitting mechanism.

In a further advantageous embodiment, in addition to the possibility of the form-fitting and/or force-fitting engagement with the fixing element, the supporting element has a sliding surface along which the inner wall of the elongate hollow body slides for shape stability during the transfer of the elongate hollow body from the first state into the second state, in order thereby to correspondingly stabilize the elongate hollow body, by means of a corresponding, supporting shape within the latter, specifically in the transition region during the unfolding process. With the aid of the form-fitting and/or force-fitting engagement with the fixing element, the supporting element remains here with its shape-stabilizing sliding surface at the axial position where the supporting element is intended to correspondingly support the elongate hollow bodies.

It is very particularly advantageous in this connection if the sliding surface is shaped conically in the unfolding direction in order thereby to correspond to the cross-sectional shape in the region of the supporting element and to correspondingly imitate said cross-sectional shape. This is because, during the unfolding, the cross section of the elongate hollow body gradually increases from the compressed state into the fully unfolded state, wherein, in the transition region, the supporting element advantageously correspondingly has such a conical transition in the form of the sliding surface.

In a further advantageous embodiment, the inner supporting element has one or more supporting rolls and/or supporting sliders which are in contact with the inner wall of the elongate hollow body for shape stabilization during the transfer of the elongate hollow body from the first state into the second state, wherein said supporting rolls and/or supporting sliders are specifically not intended to form any form-fitting connection with the outer fixing element. It is advantageous in this connection if, for at least one of the supporting rolls and/or supporting sliders, the fixing element has a mating roll and/or mating slider which is arranged in such a manner that the elongate hollow body can be guided through between the supporting roll and/or supporting slider of the supporting element and the mating roll and/or mating slider of the fixing element with contact, without a form-fitting connection being formed here in the axial direction or in the unfolding direction. It is thereby possible to realize controlled sliding along of the elongate hollow body.

In a further advantageous embodiment, the outer fixing element has a molded shell which corresponds to the shape of the elongate hollow body at this position and through which the elongate hollow body can be guided. The outer fixing element therefore surrounds the elongate hollow body in the region of the inner supporting element and copies the outer cross-sectional shape thereof in this region in particular, wherein the inner supporting element is held at this position in a force- and/or form-fitting manner. By this means, the elongate hollow body is supported in this region in a shape-stabilizing manner both to the inside and to the outside, and therefore stability impairments due to a change in shape in said region are avoided.

In a further advantageous embodiment which can be provided as an alternative or in addition, for example, to the form-fitting elements, the supporting device has a magnet device for the force-fitting axial positional fixing of the inner supporting element, wherein a first magnet is arranged on the supporting element and at least one second magnet is arranged on the outer fixing element, said magnets interacting in such a manner that the magnetic force exerted fixes the inner supporting element at the axial position within the cavity of the elongate hollow body. This is particularly advantageous if the elongate hollow body comprises a material which cannot be deformed in the radial direction.

In a further advantageous embodiment, two, three, four or optionally more elongate hollow bodies are rolled up and compressed on the winding core in a respectively first state, wherein, by rotation of the winding core, all of the elongate hollow bodies can be transferred from the first state in each case into an unrolled and unfolded second state, and wherein each elongate hollow body has a dedicated supporting device, as described above. This is advantageous, for example, if a plurality of unfoldable masts are intended to be rolled out and unfolded simultaneously with the aid of the unfolding mechanism in order thus, for example, to spread out solar sails.

The elongate hollow body can be produced here from a fiber composite material comprising a fiber material and a matrix material embedding the fiber material. It is also conceivable for the elongate hollow body to be produced from a metal material.

Figure 2:
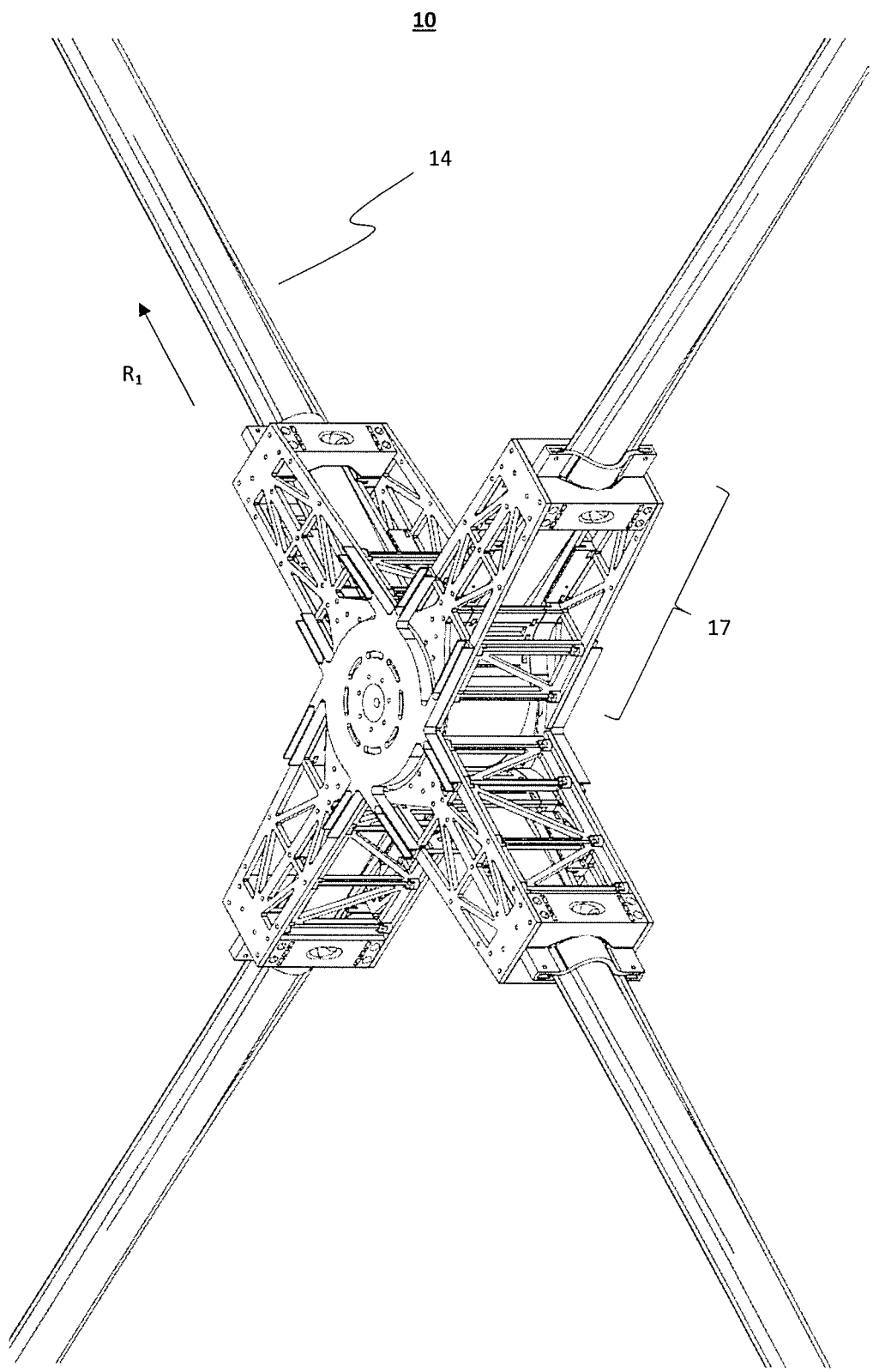
Figure 3:
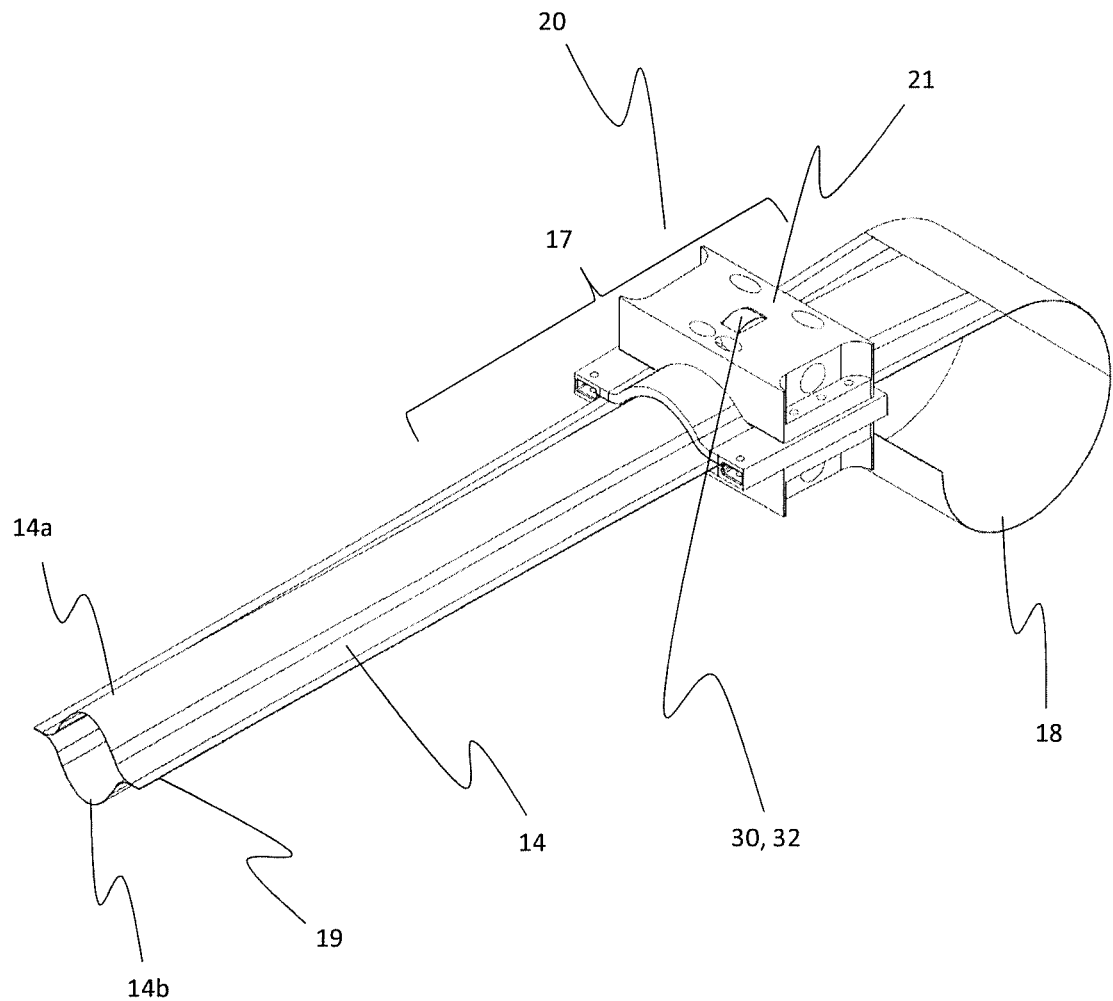
Figure 4A:
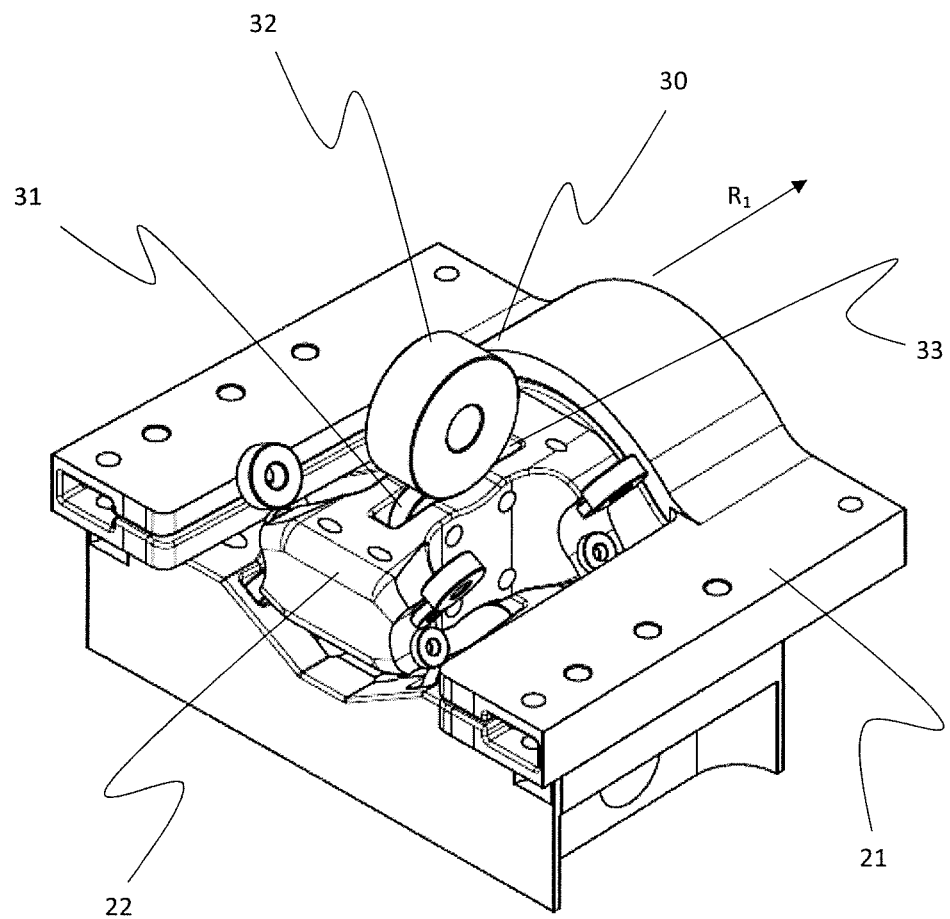
Figure 5:
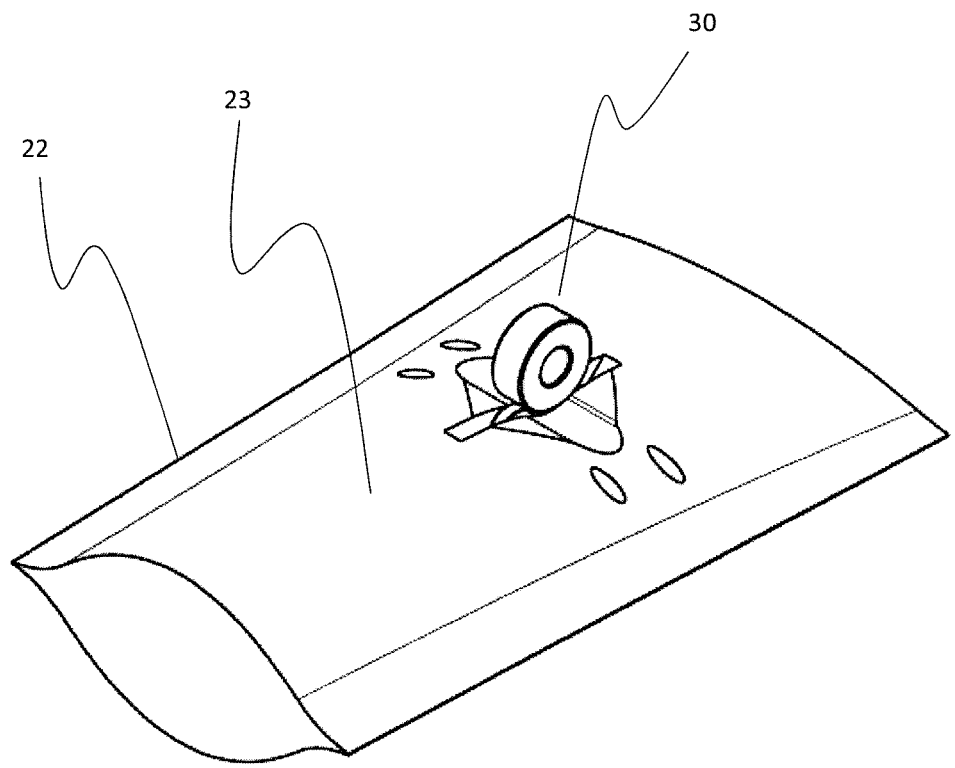
Figure 6A:
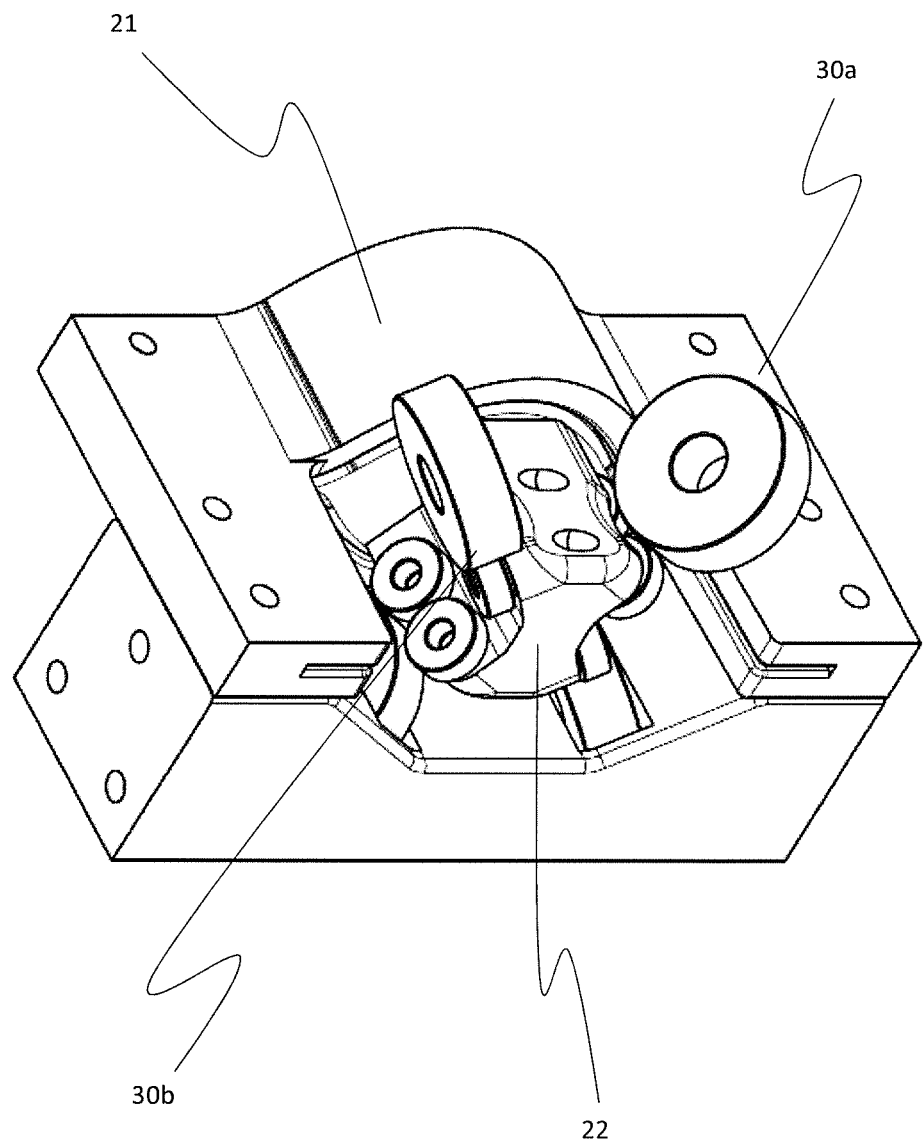
Figure 6B:
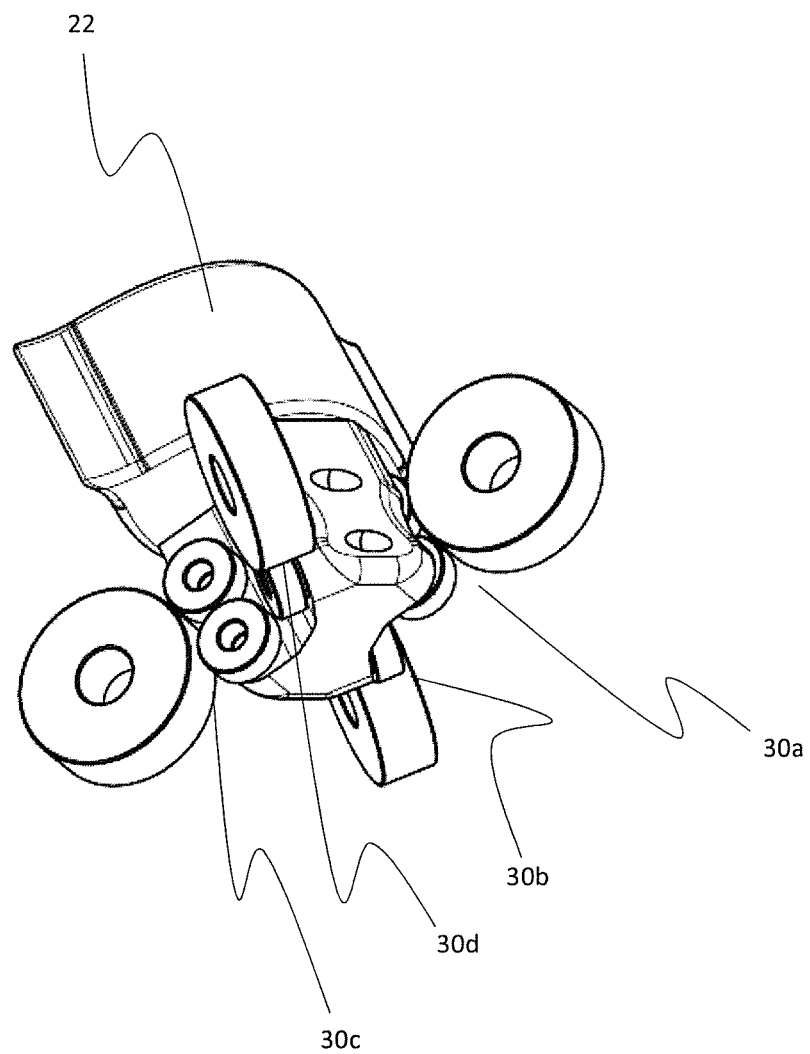

The invention is explained by way of example with reference to the attached figures, in which:

FIG. 1 shows an embodiment of the apparatus in the rolled-up state;

FIG. 2—shows an embodiment of the apparatus in the unfolded state;

FIG. 3—shows a perspective illustration of an elongate hollow body with a supporting device;

FIGS. 4*a*) to 4*c*)—show an illustration of a supporting device in a first embodiment;

FIG. 5 shows a supporting device in a second embodiment;

FIGS. 6*a*) to 6*b*) show a supporting device in a third embodiment.

The form-fitting elements shown in the following figures and the description thereof are of roll-shaped design. However, in principle, all of the form-fitting elements of roll-shaped design can also be replaced by spherical or dome-shaped form-fitting elements. The illustrations shown are therefore only by way of example.

FIG. 1 shows an illustration of the apparatus 10 according to the invention with which four elongate hollow bodies in the form of unfoldable masts can be extended. The apparatus 10 has an unfolding mechanism 11 which, in the interior, has a winding core 12 (not illustrated) on which the elongate hollow bodies 14 are rolled up and compressed in a first state. The elongate hollow bodies 14 are accordingly compressed in the manner of a flat band and are thus wound up on the cylindrical winding core 12. In the exemplary embodiment of FIG. 1, all of the four elongate hollow bodies are rolled up simultaneously on the winding core 12 in such a manner that they are rolled up one above another and can be unrolled simultaneously. FIG. 1 shows an illustration in which all of the elongate hollow bodies are rolled up on the winding core 12 and are therefore present in a first state.

The winding core 12 is arranged rotatably here on a carrying structure 13 of the unfolding mechanism 11, wherein carrying arms 15 extend from the winding core 12 of the unfolding mechanism 11 in a star-shaped manner and have corresponding guide elements 16, with the aid of which the rolled-up hollow bodies 14 are unrolled into their respective carrying arms 15 and in the process are supplied at the respective supporting device 20.

Each of the carrying arms 15 of the carrying structure 13 of the unfolding mechanism 11 has one such supporting device 20, and therefore each of the rolled-up hollow bodies 14 receives its own supporting device 20 with which the respective, rolled-up hollow body 14 is correspondingly supported in its transition region during the unfolding process.

FIG. 2 shows the apparatus illustrated in FIG. 1 in a second, unrolled and unfolded state of the hollow bodies 14. As can be seen, each of the elongate hollow bodies 14 has been guided through the respective supporting device 20 during the unrolling process, wherein the supporting device 20 is fixedly connected to the carrying structure 13 owing to the fixed arrangement to the respective carrying arm 15 and therefore in particular cannot carry out any relative movement in relation to the winding core. It is thereby ensured that, when the elongate hollow bodies 14 are unfolded, the latter carry out a relative movement in relation to the supporting device 20 in the axial direction of the unfolding direction $R_1$. The effect achieved by this is that the supporting device 20 is always arranged within the transition region 17 where the unfolding hollow bodies 14 do not yet have their fully unfolded cross-sectional profile, and therefore the stability and rigidity of the respective hollow bodies 14 is reduced in this transition region 17. FIGS. 1 and 2 show an apparatus 10 with which a total of four elongate hollow bodies 14 in the form of an unfoldable mast can be extended. In principle, however, the concept of the supporting device 20 in the transition region 17 is not restricted to the number of the hollow bodies 14, and therefore it is, of course, also conceivable for such a supporting device 20 to be able to be used in an apparatus having only one hollow body, two hollow bodies, three hollow bodies or even more than four hollow bodies.

FIG. 3 shows by way of example a hollow body 14 which has an elongate section which is already fully unfolded. The hollow body 14, as illustrated in FIG. 3, has been formed from two half shells 14a) and 14b) which have an omega-shaped cross section. In the rolled-up state, the hollow body 14 is present in the form of a rolled-up and compressed, flat band 18 which can be termed the first state. When completely unfolded, the elongate hollow body has a second state 19 in which the hollow body 14 has a double omega-shaped cross-sectional profile. The hollow body 14 has its greatest stability in the second state 19.

The cross-sectional profile of the second state 19 is developed continuously in the transition region between the first state 18 and the second state 19, wherein the hollow body 14 has not yet reached its corresponding final stability in this transition region 17. There is in particular the risk here that the elongate hollow body will buckle in the transition region 17 and will therefore damage the entire apparatus.

According to the invention, the supporting device 20 is arranged for this purpose in the transition region 17, said supporting device having a supporting element (not illustrated in FIG. 3) which lies within the hollow body 14 in the transition region 17, and also an outer fixing element 21 in order thus to position the inner supporting element in a form-fitting and/or force-fitting manner in the axial direction. It is therefore ensured that the inner supporting element which is intended to ensure additional stability of the elongate hollow body 14 in the transition region 17 remains within the transition region 17 although the hollow body 14 has a closed cross-sectional profile. By means of the form-fitting and/or force-fitting fixing of the inner supporting element in the axial direction with the aid of the fixing element 21, there does not need to be any direct mechanical connection of the fixing element 21 with the inner supporting element.

FIG. 4a) shows an embodiment of the supporting element 20, in which part of the outer fixing element 21 has been removed for the sake of better illustration. This makes it possible to see the inner supporting element 22 which is normally arranged within the hollow body 14. For the sake of better illustration, the hollow body 14 is also no longer illustrated in the following figures. For better understanding, the hollow body 14 would be guided through here between the inner supporting element 22 and the outer fixing element 21 when the hollow body is transferred from its rolled-up, first state into its unfolded, second state.

FIG. 4a) illustrates a form-fitting mechanism 30 which, in the exemplary embodiment of FIG. 4a), has a first form-fitting element 31, a second form-fitting element 32 and a third form-fitting element 33. The first form-fitting element 31 and the third form-fitting element 33, which are in the form of small rolls or rollers, are arranged here on the inner supporting element 22 while the second roll-shaped form-fitting element 32 is arranged on the part not visible of the outer fixing element 21.

The elongate hollow body guided through the supporting element 20 would accordingly have to be guided through between the second form-fitting element 32 of the fixing element 21, on the one hand, and the two other form-fitting elements—the first form-fitting element 31 and the third form-fitting element 33 of the supporting element 22.

The three form-fitting elements 31 to 33 are arranged with respect to one another here in such a manner that the elongate hollow body cannot be guided through in a straight line between the form-fitting elements but rather is pressed in the direction of the inner supporting element 22 by the second form-fitting element 32. The first and the third form-fitting elements 31 and 33 serve here as bearing points, whereas the second form-fitting element 32 presses the region of the elongate hollow body between the two form-fitting elements—the first and the third form-fitting elements—in the direction of the inner supporting element 22.

By this means, a form-fitting connection in the axial direction of the inner supporting element 22 with the fixing element 21 is achieved since the second form-fitting element 32 forms a type of undercut on the fixing element in relation to the first and the third form-fitting element of the supporting element 22, said undercut bringing about a form-fitting connection in the axial direction of the inner supporting element 22.

Figure 4B:
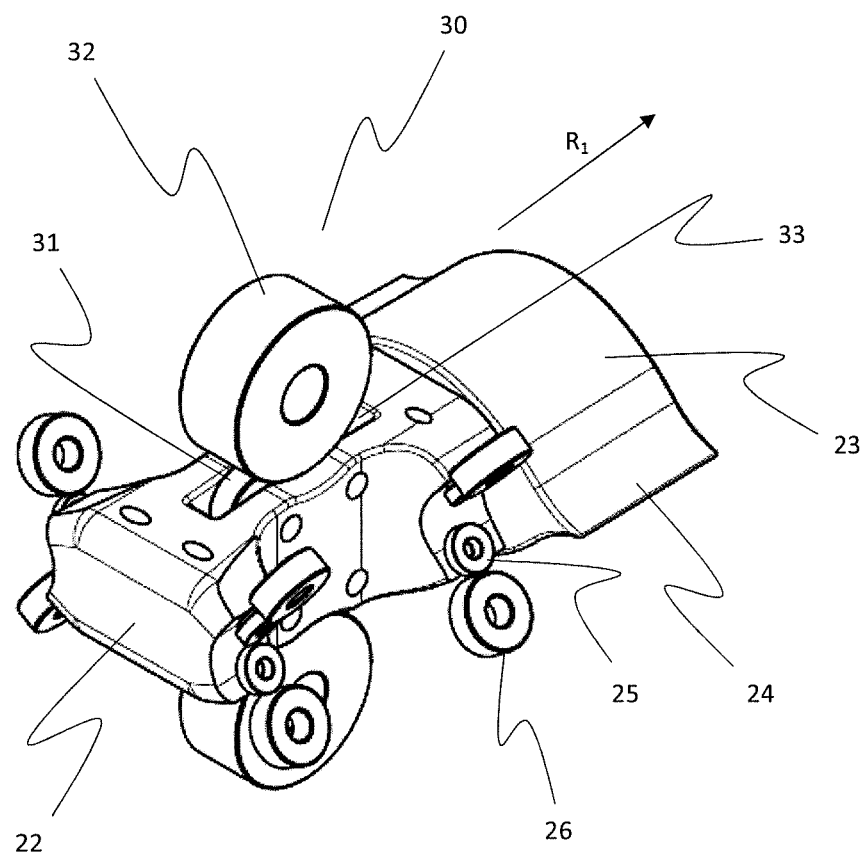

In the exemplary embodiment of FIG. 4a), there is also such a form-fitting mechanism 30 on the opposite side, as can be seen in FIGS. 4b) and 4c). By means of the second form-fitting element 32 of the respective form-fitting mechanism, the inner supporting element is clamped here between said two form-fitting mechanisms and therefore cannot move in the axial direction.

The inner supporting element 22 can be seen in FIG. 4b) without the outer fixing element 21, wherein, for the sake of completeness, the second roll-shaped form-fitting elements 32 which are necessary for the form-fitting connection are also illustrated at the same time. In the unfolding direction $R_1$, there is a sliding surface 23 on the inner supporting element, which sliding surface can be provided to lie against an inner wall of the elongate hollow body and to slide therealong and, furthermore, to prevent buckling of the elongate hollow body. The lateral ends of the sliding surface 23 have wings 24 which additionally supports the elongate hollow body in the transition region of the two half shells.

Furthermore, in the exemplary embodiment of FIGS. 4a) to 4c), the inner supporting element 22 has additional supporting rolls 25 with which the inner wall of the elongate hollow body is in contact without a form-fitting connection in its axial direction. It is thereby ensured that the inner supporting element 22 does not tilt within the elongate hollow body and therefore unfolding becomes impossible. Said supporting rolls 25 of the inner supporting element 22 can be supported here by mating rolls 26 arranged on the outer fixing element 21, and therefore the elongate hollow body is guided through between the supporting roll 25 of the inner supporting element 22 and the mating roll 26 of the outer fixing element 21.

The advantage of this variant illustrated in FIGS. 4a) to 4c) consists in that axial fixing of the inner supporting element 22 is brought about just with two form-fitting mechanisms 30, as a result of which the elongate hollow body is deformed only at two points during the unfolding because of the intended form-fitting connection. With the aid of the laterally arranged supporting rolls 25 which run at an angle, a lateral support of the inner supporting element 22 can be achieved here, as a result of which tilting of the inner supporting element 22 can be prevented.

Figure 4C:
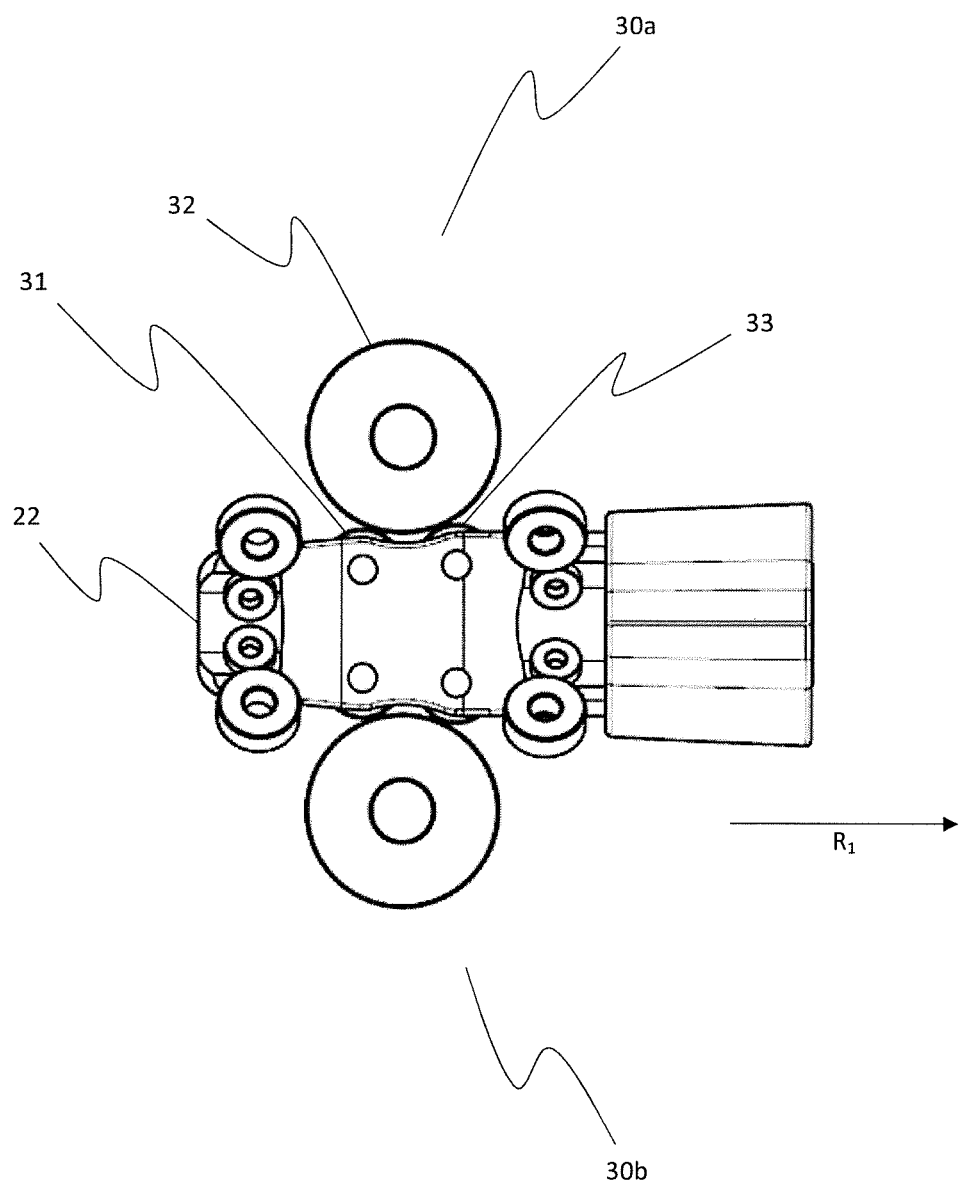

FIG. 4c) illustrates the inner supporting element 22 once again in a form in which the first form-fitting mechanism 30a) and the second opposite form-fitting mechanism 30b) of the supporting device can clearly be seen. It can also be seen that an elongate hollow body which is guided through between the second form-fitting element 32 of the outer fixing element and the two form-fitting elements—the first and third form-fitting elements 31 and 33—of the inner supporting element is deformed in the direction of the inner supporting element because of the arrangement of the second form-fitting element 32, as a result of which a corresponding form-fitting connection of the inner supporting element to the second form-fitting elements 32 of the outer fixing element is formed.

FIG. 5 shows an exemplary embodiment of an inner supporting element which, except for the form-fitting mechanism 30, is formed merely as a complete sliding surface 23, and therefore the inner wall of the elongate hollow body lies against the entire sliding surface 23 while the inner supporting element 22 is fixed axially in its position in the axial direction because of the form-fitting mechanism 30. However, in this embodiment, the inner wall friction is significantly greater, and therefore suitable materials have to be used here. The overall stability is thus significantly greater.

FIGS. 6a) and 6b) show a third embodiment in which a total of four form-fitting mechanisms 30a) to 30d) are provided. Each of said form-fitting mechanisms is constructed as already intensively described in FIGS. 4a) to 4c).

A particular feature in this embodiment is the arrangement of the individual form-fitting elements of the various form-fitting mechanisms 30a) to 30d). The axes of the form-fitting elements of the first form-fitting mechanism 30a) run here at an angle to the axes of the form-fitting elements of adjacent form-fitting mechanisms (for example second form-fitting mechanism 30b) or fourth form-fitting mechanism 30d)), wherein the angle is smaller than 180 degrees. The individual roll-shaped form-fitting elements of the various form-fitting mechanisms are therefore arranged obliquely with respect to one another, wherein opposite form-fitting mechanisms can have corresponding parallel axes their form-fitting elements. By this means, there does not need to be any further supporting rolls within the core since the inner supporting element 22 is supported in all of its directions by said four form-fitting mechanisms 30a) to 30d). However, in this variant embodiment, the elongate hollow body is deformed at a total of four different points in order to obtain the form-fitting connection, which is associated with a generally higher material loading. Such a supporting element 22 thus has fewer rotating parts in comparison to the first variant in FIGS. 4a) to 4c) and is therefore possibly less fragile.

LIST OF REFERENCE SIGNS

10 Apparatus for the unfolding
11 Unfolding mechanism
12 Winding core
13 Carrying structure
14 Elongate hollow body
15 Carrying arms
16 Guide elements
17 Transition region
18 First state
19 Second state
20 Supporting device
21 Outer fixing element
22 Inner supporting element
23 Sliding surface
24 Sliding surface wing
25 Supporting rolls
26 Mating rolls
30 Form-fitting mechanism
31 First roll-shaped form-fitting element
32 Second roll-shaped form-fitting element
33 Third roll-shaped form-fitting element
$R_1$ Axial unfolding direction

The invention claimed is:

1. An apparatus for unfolding a rolled-up, elongate hollow body, comprising:
at least one elongate hollow body which has a closed cross-sectional profile, and
an unfolding mechanism which has a winding core on which the at least one elongate hollow body is rolled up and compressed in a first state and which, by rotation, transfers the at least one elongate hollow body from the first state into an unrolled and unfolded second state,
wherein the unfolding mechanism has a supporting device which comprises
an inner supporting element arranged in a cavity within the at least one elongate hollow body and which at least partially lies against an inner wall of the at least one elongate hollow body, and
an outer fixing element arranged outside the at least one elongate hollow body in a region of the inner supporting element such that the at least one elongate hollow body is guidable between the outer fixing element and the inner supporting element,
wherein the inner supporting element interacts with the outer fixing element in an axial direction of the at least one elongate hollow body in a form-fitting and/or force-fitting manner for axial positional fixing of the inner supporting element without being directly mechanically connected thereto.

2. The apparatus according to claim 1, wherein the unfolding mechanism has a framework on which the winding core and the outer fixing element are fixedly arranged.

3. The apparatus according to claim 1, wherein the supporting device of the unfolding mechanism is arranged in a transition region within which one section of the at least one elongate hollow body is unrolled from the winding core, but is not completely unfolded.

4. The apparatus according to claim 1 wherein the supporting device further comprises at least one form-fitting mechanism which has at least two form-fitting elements, wherein a first form-fitting element of the at least two form-fitting elements is arranged on the supporting device and a second form-fitting element of the at least two form-fitting elements is arranged on the outer fixing element such that the at least one elongate hollow body is guidable between the first and the second form-fitting element, wherein the first form-fitting element forms a form-fitting connection with the second form-fitting element in the axial direction of the at least one elongate hollow body.

5. The apparatus according to claim 4, further comprising a third form-fitting element which is either arranged on the supporting element and interacts with the second form-fitting element in a form-fitting manner, or which is arranged on the fixing element and interacts with the first form-fitting element in a form-fitting manner.

6. The apparatus according to claim 4, wherein the at least one form-fitting mechanism comprises a plurality of form-fitting mechanisms.

7. The apparatus according to claim 6, wherein at least two form-fitting mechanisms of the plurality of form-fitting mechanisms are arranged such that a plane of contact surfaces of the form-fitting elements of a first of the at least two form-fitting mechanisms run at an angle of less than 180° with respect to a plane of contact surfaces of the form-fitting elements of a second of the at least two form-fitting mechanisms.

8. The apparatus according to claim 6, wherein at least a first form-fitting mechanism of the at least two form-fitting mechanisms is provided on the supporting device on a first side of the at least one elongate hollow body and at least a second form-fitting mechanism of the at least two form-fitting mechanisms is provided on the supporting device on a second side of the at least one elongate hollow body, wherein the second side of the at least one elongate hollow body lies opposite to the first side of the at least one elongate hollow body.

9. The apparatus according to claim 1 wherein the inner supporting element has a sliding surface along which the inner wall of the at least one elongate hollow body slides for shape stabilization during transfer of the at least one elongate hollow body from the first state into the second state.

10. The apparatus according to claim 9, wherein the sliding surface is shaped conically in an unfolding direction of the at least one elongate hollow body.

11. The apparatus according to claim 1 wherein the inner supporting element has one or more supporting rolls and/or supporting sliders which are in contact with the inner wall of the at least one elongate hollow body for shape stabilization during the transfer of the at least one elongate hollow body from the first state into the second state.

12. The apparatus according to claim 11, wherein at least one of the one or more supporting rolls and/or supporting sliders has a mating roll and/or mating slider of the outer fixing element arranged such that the at least one elongate hollow body is guidable between the at least one of the one or more supporting rolls and/or supporting sliders of the supporting element and the mating roll and/or mating slider of the outer fixing element with contact.

13. The apparatus according to claim 1 wherein the outer fixing element has a molded shell which corresponds to a shape of the at least one elongate hollow body at at least one position and through which the at least one elongate hollow body is guidable.

14. The apparatus according to claim 1 wherein the supporting device comprises a magnet device for force-fitting axial positional fixing of the inner supporting element, wherein the magnet device comprises at least one a first magnet is arranged on the supporting element and at least one second magnet is arranged on the outer fixing element, wherein the at least one first magnet and the at least one second magnet interact such that a magnetic force exerted therebetween fixes the inner supporting element at the axial position within the cavity of the at least one elongate hollow body.

15. The apparatus according to claim 1 wherein the at least one elongate hollow body includes two, three, four or more elongate hollow bodies rolled up and compressed on the winding core in a respectively first state, wherein, by rotation of the winding core, all of the two, three, four or more elongate hollow bodies are transferred from the first state in each case into an unrolled and unfolded second state, and wherein each of the two, three, four or more elongate hollow bodies has a dedicated supporting device.

16. The apparatus according to claim 1 wherein the at least one elongate hollow body is produced from a fiber composite material comprising a fiber material and a matrix material embedding the fiber material, or wherein the at least one elongate hollow body is produced from a metal material.

* * * * *